United States Patent [19]
Chraplyvy et al.

[11] Patent Number: 5,847,862
[45] Date of Patent: Dec. 8, 1998

[54] MULTI-CHANNEL OPTICAL FIBER COMMUNICATION SYSTEM

[75] Inventors: Andrew R. Chraplyvy, Matawan; Fabrizio Forghieri, Princeton Junction; Robert William Tkach, Little Silver, all of N.J.

[73] Assignee: Lucent Technologies Incorporated, Murray Hill, N.J.

[21] Appl. No.: 980,849

[22] Filed: Nov. 29, 1997

Related U.S. Application Data

[63] Continuation of Ser. No. 489,243, Jun. 12, 1995, abandoned.

[51] Int. Cl.$^6$ .............................. H04B 10/12; H01S 3/30
[52] U.S. Cl. ......................... 359/337; 359/164; 359/341; 372/6
[58] Field of Search .................................. 359/164, 334, 359/337, 341; 385/5, 8; 372/6, 33

[56] References Cited

U.S. PATENT DOCUMENTS

| | | | |
|---|---|---|---|
| 4,261,639 | 4/1981 | Kogelnik et al. | 350/96.15 |
| 4,945,531 | 7/1990 | Suzuki | 356/352 |
| 5,225,922 | 7/1993 | Chraplyvy et al. | 359/124 |
| 5,327,516 | 7/1994 | Chraplyvy et al. | 385/123 |
| 5,365,362 | 11/1994 | Gnauck | 359/341 |

OTHER PUBLICATIONS

Vazquez et al, 23rd European Microwave Conf. Proc., Sep. 6, 1993, pp. 755–777; abst. only herewith.
Zou et al, '95 OFC, vol. 8, Mar. 3, 1995, pp. 152–153, abst. only herewith.
*Optical Fiber Telecommunications*, by S.E. Miller and I.P. Kaminow, Academic Press, Inc., p. 809 (1988).
*IEEE Photon. Tech. Lett.*, vol. 5, No. 6, pp. 666–668 (1993).
Postdeadline Paper PD4-1—PD4-5 at OFC '95 (Feb. 26–Mar. 3, 1995) "Long–period Fiber Gratings as Band–rejection Filters".
*Electron. Lett.*, vol. 29, No. 2, pp. 154–156 (1993).
*Electron. Lett.*, vol. 29, No. 11, pp. 1025–1026 (1993).

*Primary Examiner*—Nelson Moskowitz
*Attorney, Agent, or Firm*—George S. Indig

[57] ABSTRACT

A significant part of signal-to-noise degradation in WDM optical fiber communications, due to Raman crosstalk, is found to be deterministic in nature. Shaping of amplifier output to offset depletion of high frequency channels improves signal capacity by an order of magnitude.

12 Claims, 3 Drawing Sheets

MULTI-CHANNEL OPTICAL FIBER COMMUNICATION SYSTEM

This application is a continuation of application Ser. No. 08/489,243, filed on Jun. 12, 1995, now abandoned.

TECHNICAL FIELD

Amplified, wavelength division multiplexed, optical fiber communication system for minimizing Raman crosstalk.

DESCRIPTION OF RELATED ART

The chronicle of advances permitting state-of-the-art optical fiber communications systems includes:

Single-mode fiber avoiding capacity limitations due to mode dispersion;

Compositions, designs and manufacture to reduce fiber insertion loss to present levels of 0.2 dB/km–0.25 dB/km;

Identification of the $\lambda=1550$ nm transparency window in silica fiber;

Dispersion shifted fiber (DSF) design to null chromatic dispersion and permit high bit-rates at the nominal system wavelength of 1550 nm;

Concatenation and dispersion compensation to maintain high signal bit-rates in dispersive fiber;

Wavelength division multiplexing (WDM) to permit multiple-channel operation in a single fiber;

Erbium-doped fiber amplifier (EDFA) to both increase span length between regenerators, and to simultaneously amplify member channels of a WDM set at the nominal system wavelength of $\lambda=1550$ nm;

Raman amplification as alternative to the EDFA, or for use at other wavelengths;

Recognition of the disability of DSF for high-density WDM due to 4-wave mixing (4 WM), and Introduction of finite dispersion fiber for overcoming 4 WM, see U.S. Pat. No. 5,327,516, Jul. 5, 1994, and U.S. Pat. No. 5,587,830, issued Dec. 24, 1996 claiming related systems and alternatives avoiding DSF.

Typical state-of-the art systems in planning provide for 360 km fiber spans including two EDFAs, 4-channel WDM operation, and 2.5 Gbit per-channel operation to result in a system capacity of 10 Gb. Greater system capacity—more channels and/or higher per-channel bit-rates—are permitted.

Attention is now being given to still larger systems which are no longer 4 WM-capacity limited. Ultra-high capacity, long haul systems may be severely limited by stimulated Raman scattering (SRS) crosstalk. This seemingly intractable non-linear phenomenon results in transfer of energy from high frequency to lower frequency channels between juxtapositioned pulses.

Terminology

WDM (Wavelength Division Multiplexing)—Multiple channel operation, generally closely spaced, typically $\leq 5$ nm, so that a WDM set is accommodated by the spectral width of an individual optical amplifier (e.g., a 10-channel set with channel separation 0.5 nm–1.5 nm to fit within the 10–20 nm spectral width of an erbium doped fiber amplifier.)

Fiber Span or "Span"—Length of fiber without electronic conversion. Within the context of the invention a span may include one or more amplifiers.

SRS Crosstalk—Stimulated Raman Scattering whereby a high frequency WDM channel is depleted by transfer of energy to a lower frequency channel via a molecular vibration.

EDFA—Erbium Doped Fiber Amplifier.

Chromatic Dispersion or "Dispersion"—Wavelength-dependent velocity for electromagnetic wave energy.

DSF—Dispersion-shifted fiber in which the dispersion is substantially nulled at the system wavelength of $\lambda_S=1550$ nm.

Unshifted or "Conventional" Fiber—The term applied to the commercially prevalent form of single mode fiber in which dispersion is zero at a wavelength of $\lambda \approx 1310$ nm.

Finite Dispersion Fiber—Fiber of dispersion of an absolute value of 1.5–4 ps/nm-km (e.g., the fiber designed for operation at $\lambda_S=1550$ nm in accordance with U.S. Pat. No. 5,327,516, Jul. 5, 1994).

Concatenation—Fiber system in which dispersion is balanced by successive lengths of fiber of opposite signs of dispersion in accordance with U.S. Pat. No. 4,261,639, Apr. 14, 1981.

Dispersion Compensation—Fiber system in which dispersion is balanced by use of a length of dispersion compensating fiber (DCF)—differs from concatenation in that the magnitude of the DCF is ordinarily at least five times that of the transmission fiber being compensated.

SNR—Signal to noise ratio.

System Wavelength—Generally expressed as a specific value, e.g., $\lambda_S=1550$ nm, represents a range of wavelengths in accordance with connotation. Ordinarily, it refers to the spectral width of the silica transparency window or to the EDFA passband.

SUMMARY OF THE INVENTION

SRS crosstalk in WDM fiber systems, is found to include a significant average deterministic component which may be the dominant SRS contribution. Appropriate spectral shaping suppresses this component.

In the usual form of the invention output of optical amplifiers is shaped by providing for decreasing amplification ratio for channels of increasing wavelength. Shaping may be by a fixed filter, without requirement for continuous adjustment.

The invention impacts systems of capacity-length product sufficiently large to be capacity-limited by SRS. A threshold value for systems, of representative state-of-the-art parameters, to which the invention is usefully applied is expressed as the product of per-channel bit-rate, number of channels, and span length. A product of at least 320,000 km-Gbit/sec qualifies systems either for initial operation or for contemplated upgrading.

Filter design suitable for a preferred embodiment may follow design principles used for flattening EDFA spectral output.

DETAILED DESCRIPTION

General

It is appreciated that non-linear effects are the ultimate limitation on optical fiber lightwave systems. See, *Optical*

*Fiber Telecommunications II,* by S. E. Miller and I. P. Kaminow, Academic Press, Inc. p. 809 (1988). With the various techniques for managing chromatic dispersion; with the emergence of the erbium-doped fiber amplifier (EDFA); and with lasers offering launch powers of many milliwatts, optical non-linearities become controlling. These include stimulated Raman scattering (SRS); stimulated Brillouin scattering (SBS); self-phase modulation (SPM); cross-phase modulation (CPM); and 4-wave mixing (4 WM).

*IEEE Photo. Technol. Lett.,* vol. 5, pp. 666–668 (1993), assesses the impact of non-linearities on state-of-the-art systems. Disregarding non-linearities, WDM operation, at a nominal systems wavelength of 1550 nm, permits capacity of tens of terabits/sec: taking non-linearities into account, capacity is reduced to tens of gigabits/sec. Procedures for minimizing most of the non-linearities are known, leaving SRS as the major concern, and as ultimately responsible for this reduction in capacity. The effect of SRS has been regarded as purely statistical, with incidence and magnitude of scattering entirely based on instantaneous correspondence of pulses in the member channels, and therefore as intractable.

It is now found that depletion caused by SRS has an average deterministic component which, under many conditions is of large magnitude, and may become the dominant source of SNR degradation. It is now found that statistical variations of the depletion caused by SRS are greatly reduced by the presence of sufficient chromatic dispersion and/or by large numbers of channels. Thus, SNR degradation caused by SRS may be greatly reduced by spectral shaping of the spectrum made up of a WDM channel set—e.g. by shaping the amplifier gain to favor the higher frequency, SRS-depleted, channels. Typical system design permits an improvement in capacity of five or more, allowing a system capacity of one hundred to a thousand or more gigabits/sec. Earlier workers have developed procedures for power equalization, for example to assure uniform channel-to-channel amplification by an EDFA. Principles of filter design for "flattening" the amplification spectrum are suitable for producing the sloped spectrum required for shaping to reduce SRS.

Long haul system design is a compromise between "launch power" (power introduced into the system at each amplifier) and amplification. As launch power is increased, systems become more susceptible to SRS degradation. The alternative of lower power results in systems which are limited by amplifier noise. EDFA spacings of 100 km and larger, used in today's systems, are not optimal—better integrated SNR results from smaller spacings, of 40 km–60 km. These considerations generally lead to spans of 1000 km and larger.

The System

Figure 1:
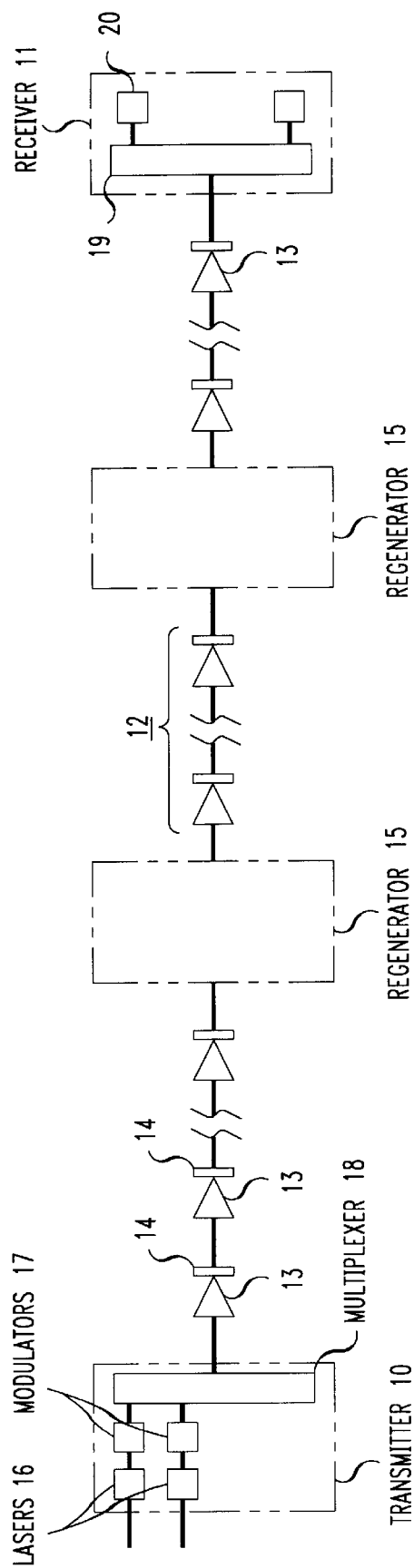
FIG. 1 is a circuit diagram of a relevant optical fiber communication system.

FIG. 1 is representative of systems using the inventive procedure. It includes a transmitter 10 and receiver 11, together with an interconnecting transmission line 12 containing a number of amplifiers 13. Illustratively, each amplifier is accompanied by a filtering element 14. Optional regenerators 15 are shown in phantom. The implications of the invention pertain to each individual span without regard to number of spans. Successive spans are bounded by regenerators in multi-span systems. Under most circumstances, transmitter, receiver and regenerators include means for optical-to-electronic and/or electronic-to-optical signal conversion, functions requiring multiplexing and/or demultiplexing. In transmitter 10, channel carriers are produced by lasers 16, signal information is introduced by modulators 17, and signals are combined in multiplexer 18. Functions of receiver 11 are carried out by demultiplexer 19 and by individual channel detectors (optical-to-electronic converters) 20. Regenerators function as combined receiver-transmitter pairs. Individual regenerator elements are not shown. Amplifiers should be considered optional elements—application of the invention to visualized long-haul repeater systems is contemplated. Under such circumstances, passive filter elements 14 may be positioned as shown.

System parameters have been generalized by a three-part product—per-channel bit-rate×number of channels×span length. For one contemplated set of parameters, the numerical value of the product is 320,000 km-Gbit/sec. This assumes: an amplifier noise figure of 6 dB; 50 km amplifier-to-amplifier spacing; and equal channel spacings equal to the product of 6.25×bit-rate in Gbit/sec. The product of 320,000 km-Gbit/sec is considered the threshold at which systems beneficially employ the inventive teaching. For this particular numerical value, and assuming the recited system parameters, this approximates the threshold at which immediate operation is improved. For likely improvements in these parameters, resulting in a numerically larger product, shaping is appropriate in avoiding SRS limitations which may be introduced upon upgrading—permitting further increased capacity by shaping.

Other considerations lead to a likely minimum span length of 1000 km and eventually to spans of many thousands of km. For EDFAs, minimal integrated amplifier noise corresponds with amplifier spacings of 40 km–60 km, so that a 1000 km span typically includes 25 amplifiers.

The EDFA is likely to continue to be the amplifier of choice for 1550 nm systems for non-soliton operation. Operation at this or other wavelengths may substitute other fiber amplifiers—e.g. praseodymium in silica or in fluoride-based glass. Crystal media may replace glass, and Raman amplifiers may be used. Alternative amplifier designs ideally approach inherent amplifier loss characteristics, so that fiber loss becomes the spacing determinant. The spacing range of 40 km–60 km is likely to represent a general condition so long as fiber insertion loss remains in the present range of about 0.2–0.25 dB/km. Improved fiber loss will lead to greater spacings—e.g. halfing the loss in dB doubles the desirable spacing range.

Relative magnitudes of bit-rate and number of channels depend on particular system needs. There are circumstances under which two-channel systems—very long length or very high bit rate—are desirable. Contemplated systems include the other extreme—have 100 or more channels and lower bit-rates. Choice of channel spacing is of some consequence regarding Raman exchange—smaller spacings result in lesser drive force and in smaller SRS degradation. In general, channel spacings will be determined by other system needs—e.g. available amplifier passband; nature of the transparency "window" of the fiber; and minimization of 4 WM (which may suggest tailored uneven spacings in accordance with U.S. Pat. No. 5,546,210, issued Aug. 13, 1996). Contemplated long-haul systems are expected to operate at high per-channel bit-rates. There is certainly value in the new approach for 2.5 Gb/sec, but future systems are likely to operate at higher rates—at 5 Gb/sec–10 Gb/sec or higher.

Accompanyment of each amplifier by a filter is likely to be the arrangement of choice under most circumstances. It has been found desirable to keep average depletion between filters at or below a few dB—preferably at at maximum of 1 dB. For contemplated designs, this matches amplifier-to-amplifier SRS depletion. For many channels, and consequently high-power, depletion is likely to be excessive. This leads to filter spacings which are smaller than needed amplifier spacings, and this may be inexpedient. In very long systems—consequently, relatively low total power systems—the same consideration may permit filter placement at alternate amplifiers or even at greater spacings.

The SRS mechanism, as a non-linearity, suggests desirability of "linearization": i.e. accommodation before its contribution increases to an unwieldy magnitude. This intuitive approach is supported by the simulations and calculations used for developing much of the reported data. The fact remains that a deterministic fraction, now found to be of considerable magnitude, is redressable. The magnitude of the SRS effect may indeed increase more rapidly above some low ("linear") threshold, and it may tend to become unmanageable, so that permitting attainment of excessive values may be poor practice. Nevertheless, by use of other algorithms, or by empirical determination, it is possible to spectrally shape, e.g., the output of an amplifier, to the extent necessary to accommodate a depletion loss in excess of the formalized 0.5 dB–1.0 dB level of convenience. The implication is of significance for short spans with power levels required for the bit-rates and numbers of channels necessary to meet the threshold mathematical product of 320,000 km-Git/sec.

A number of circuit elements have not been shown. These include provisions for adding channels, for dropping channels, for telemetry, etc. The circuit shown is representative of likely initial use. With presently available fiber losses and power levels, long spans will depend on optical amplification. Under these circumstances, it is, as stated, convenient to position filters at amplifier sites (although closer filter spacing may be useful). The possibility of very long spans without amplification—spans of 300 km or more in length—results in a relative increase in the magnitude of Raman-induced noise. Under these circumstances, the desirability of shaping, independent of amplification, may be considered.

Figure 2:
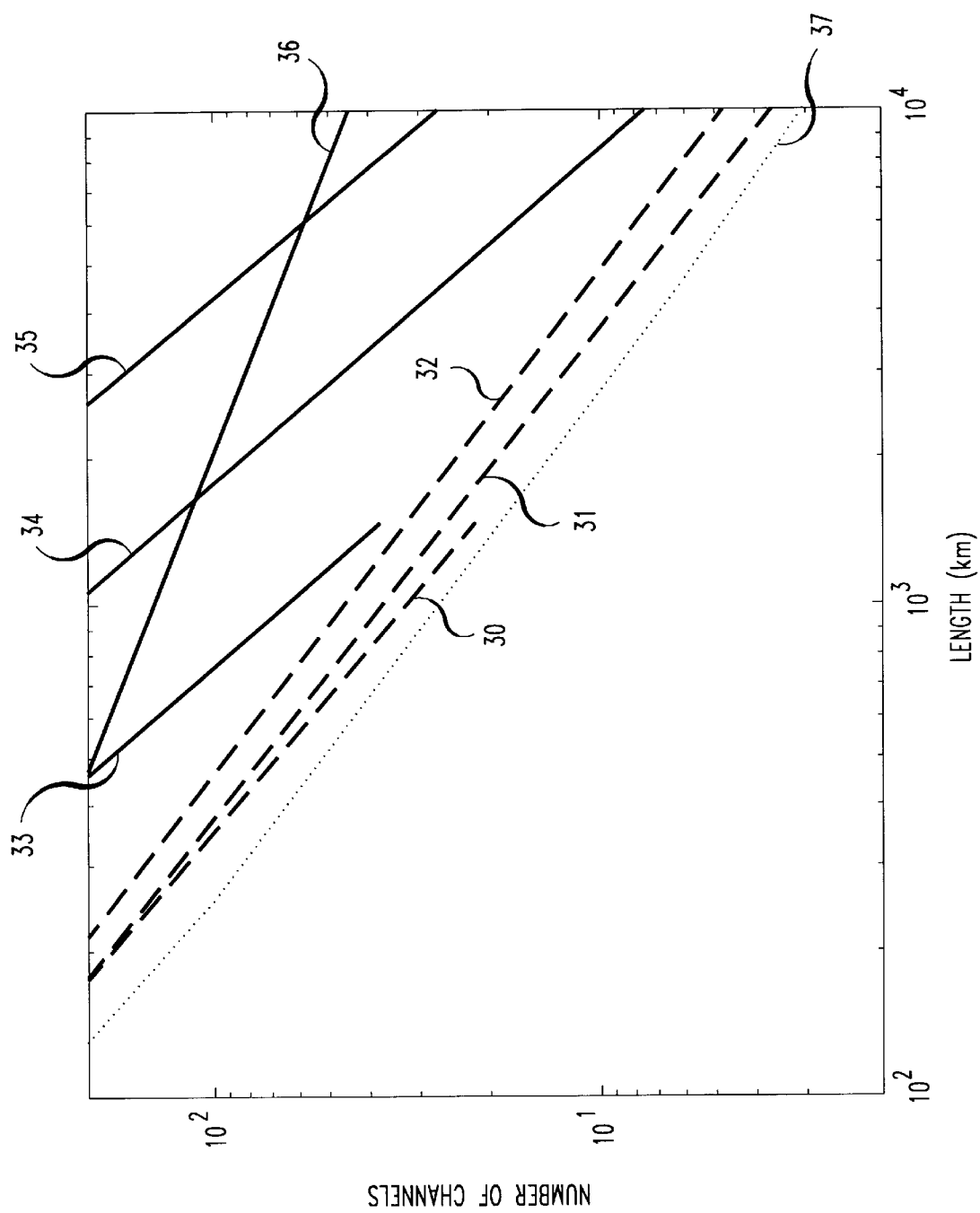
FIG. 2 is a plot for the permitted number of WDM channels for varying system length. The threshold number of channels is based an SNR degradation of 0.5 dB.

FIG. 2 is plotted on the basis of system simulations and analytical calculations, and includes data for the Examples. All systems operate at a nominal system wavelength of 1550 nm, with 50 km amplifier spacings, and are somewhat conservative in setting span length as equal to the distance over which SNR degradation attains the value of 0.5 dB. Receiver margin of 10 dB and amplifier noise figure of 6 dB are reasonably representative. Per-channel bit-rate is 10 Gb/sec, WDM channel spacings are uniform at 0.5 nm, and fiber insertion loss is 0.2 dB/km. This results in an average launch power of a few mW per channel for a 5000 km span (at 2.3 dBm/channel). All values assumed are typical state-of-the-art values. Likely future improvements will further increase attainable span lengths and capacity.

Curves are included for three exemplary fiber types: DSF, nominally with zero dispersion at the system wavelength of $\lambda_S$=1550 nm; finite dispersion fiber with dispersion in the range of 1.5–4 ps/nm-km; and conventional fiber with dispersion of approximately 16–17 ps/nm-km. The effect of dispersion is to introduce a walk-off between pulses transmitted on different channels, thereby causing more bits to interact. Its effect is similar to an increase in a number of channels. The impact of the invention is most significant for dispersive systems since the effect of increasing dispersion is to decrease the fraction of SRS which is statistical (i.e. to decrease the non-deterministic fraction). Dispersion, therefore, increases the fractional share of deterministic SRS which is amenable to shaping, with relative improvement in SRS-limited capacity. A dispersion of at least about 1.0 ps/nm-km is assurance of sufficient improvement—~3x—to justify use of the invention under most conditions. Fiber of dispersion of negative sign of the value of 1.0 ps/nm-km or less has been specified for transoceanic systems—upgrading to WDM use is facilitated by the inventive procedures.

While, as seen from FIG. 2, there may be a two-fold improvement using DSF, preferred embodiments contemplate minimal dispersion values of 1.0 ps/nm-km, or more desirably, 1.5 ps/nm-km. Inclusion of substantial lengths of low-dispersion fiber does not, to first approximation, affect improvement realizable elsewhere in the system. For the inventive purposes, transmission line of the minimal dispersion values for a distance totaling at least 1000 km is considered to justify spectral shaping.

System representations on FIG. 2 are for the three types of fibers, both without and with shaping. Dash-line curves 30, 31 and 32 are for: DSF; finite dispersion fiber; and conventional fiber, respectively, without filtering. Corresponding shaped systems are shown as solid curves 33, 34 and 35. The solid curves assume filter placement independent of amplifiers—with filters placed at fiber intervals over which SRS depletion reaches 0.5 dB. Since long lengths plotted correspond with relatively low power insertion (correspond with relatively small numbers of channels), the 40 km–60 km spacings found desirable for EDFAs correspond with depletion values at or below 0.5 dB, filters may be expediently placed at amplifier sites. For relatively short lengths plotted, amplifier-to-amplifier depletion exceeds this value. Accordingly, curves 33, 34 and 35 may not be realistic. Curve 36 takes this into account and shows operational characteristics with the further requirement that filters not be closer than amplifiers. Curve 36 sets an upper-bound, on realizable SNR (of SRS origin) improvement independent of fiber dispersion. Curve 37 is included for comparison purposes, and shows the relationship for a "worst-case analysis"—in which phase correspondence of pulses is assured in all channels. (This condition is approached for a hypothetical fiber of channel-to-channel dispersion precisely at zero and with pulses in phase at insertion.)

All curves disregard other non-linear capacity-restrictions. While most other non-linearities may be accommodated, 4 WM may be significant. DSF systems have been shown to be 4 WM-limited for the usual instance in which channel-to-channel spacings are constant. It has been shown, however, that channel spacings may be tailored to avoid coincidence of mixing products on channel carriers. See U.S. Pat. No. 5,546,210, cited above. Only under this latter circumstance is the impact of the invention generally significant, at least on four or more channel systems using DSF fiber (so that the results reported on curve 33 become realistic).

Figure 3:
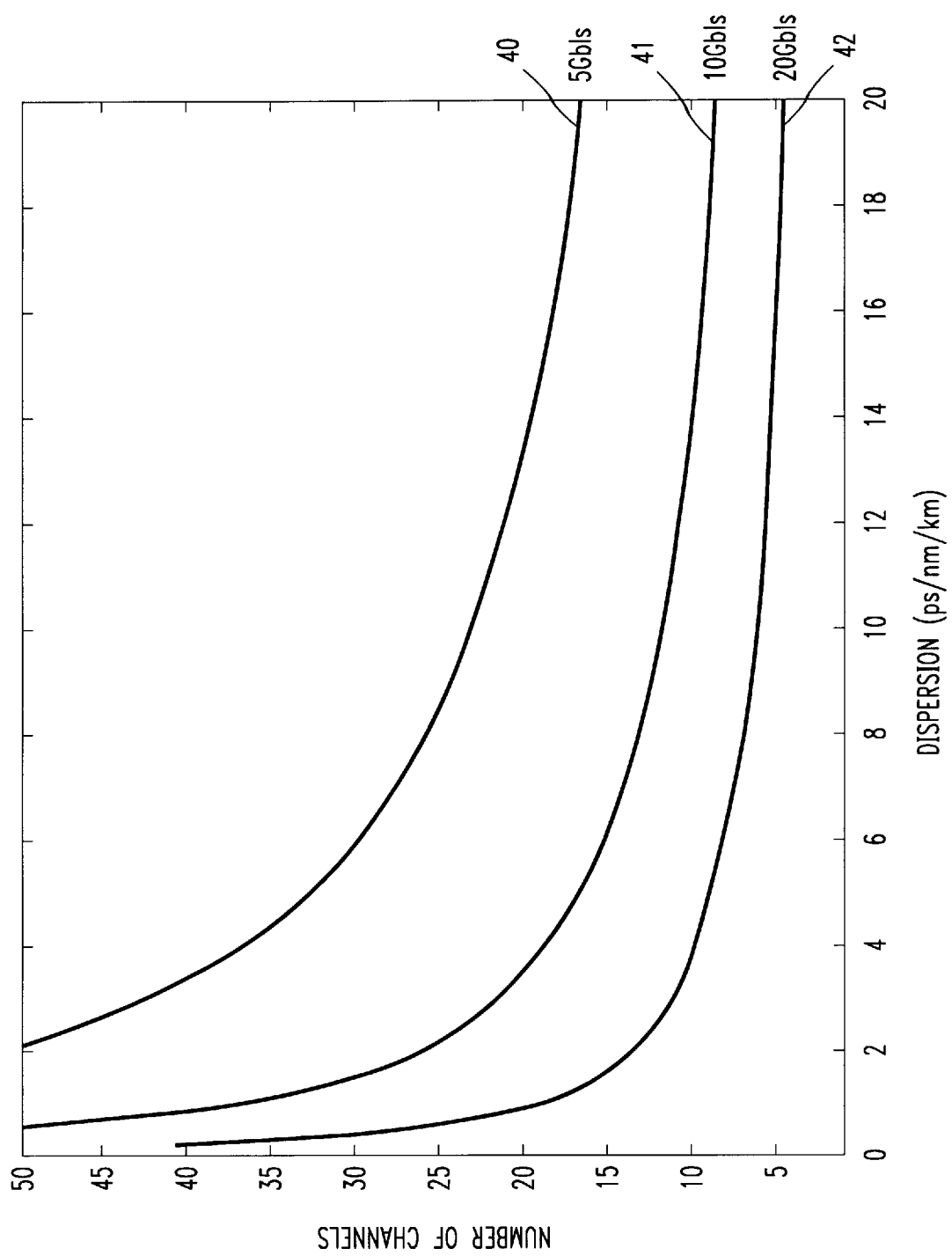
FIG. 3 is a plot of number of channels versus dispersion showing the dependence of the improvement on fiber dispersion for three different bit-rates.

The data plotted on FIG. 3 is illustrative of a preferred embodiment in which the deterministic fraction of SRS depletion is at least 90% of the total SRS depletion. The figure shows the minimum number of channels required to reduce the statistical fluctuation of crosstalk sufficiently to meet this desire (to result in a ratio of 10% or less between the standard deviation and the average). Data is for: a fiber span of 50 km; with fiber loss of 0.25 dB/km; channel spacings equal to the product of 6.25 and per-channel bit-rate, for three bit-rates—5 Gb/sec, 10 Gb/sec, 20 Gb/sec (curves 40, 41, 42, respectively).

Description has been largely in terms of uniform-dispersion fiber. With the recognition of 4 WM impairment of WDM, DSF systems, concatenation and dispersion compensation are under consideration for WDM use. The basis of the present teaching—realizable lessening of SRS degradation due to its deterministic nature—continues to be applicable. A measure of the improvement is to be gained from FIG. 2 (considering lengths of various fiber types separately).

Soliton operation, in accordance with the general view, is susceptible both to SRS degradation and to the inventive remedy. In fact, the essential nature of the soliton, in requiring maintenance within specified power limits, may gain further advantage from the invention.

Filter Design

The long-period fiber grating design of the cited U.S. Pat. No. 5,430,817, issued Jul. 4, 1995 is at an advanced state of development, and is considered desirable. Grating lines are produced in germania-doped silica fibers by exposure to UV light—the KrF$\lambda$=248 nm is effective. Principle of operation depends on grating periodicities that couple fundamental core mode to forward-propagating cladding modes. Coupled energy decays rapidly owing to lossy cladding-coating interface and bends in the fiber. Wavelength dependence of coupling efficiency is responsible for shaping. Design criteria were presented in Postdeadline paper PD4-1-PD4-5 at OFC '95 (Feb. 26–Mar. 3, 1995). An expanded version of the paper is scheduled to appear in the September 1995 *J. of Lightwave Tech.* under the title "Long Period Fiber Gratings as Band-Rejection Filters".

Generally, on the assumption that uniformly decreasing loss is to be superimposed on a flat amplification spectrum, the filter loss peak should be placed on the long wavelength side of the WDM channel set. The assumption is valid for designs in which standard arrangements have been made to eliminate irregularities in the spectrum and to assure flat output.

The needed slope for correcting for SRS depletion is readily determined from the fiber depletion loss. The shaped amplifier output spectrum should have a slope corresponding with a highest-frequency channel gain which is larger than the lowest-frequency channel gain by the depletion loss for the fiber length to be compensated. Accordingly, for the 0.5 dB–1.0 dB spacing considered desirable for state-of-the-art fiber, slope should be 0.5 dB–1.0 dB, increasing in value in the direction of decreasing wavelength, as between the extreme channel wavelengths.

Alternative filter designs are described in *Electron. Lett.*, vol. 29, pp. 154–156 (1993) and *Electron. Lett.*, vol. 29, pp. 1025–1026 (1993), describing Bragg grating designs. Co-pending U.S. patent application Ser. No. 08/365,618 filed Dec. 28, 1994, now allowed, describes filtering with a chain of optical couplers of different effective lengths, together forming a Fourier series producing the desired response. This design approach is suitably used for the inventive purpose.

Filter discussion has generally been in terms of the single individual element used for shaping an amplifier output from an initially flat spectrum. It may consist of two or more elements, again with the objective of altering an initially-flat amplification spectrum. While this approach is convenient, one or more combined elements may perform additional functions, e.g., as cancellation of perturbations. Another approach attenuates the channel separately and contemplates demultiplexing before filtering.

It is an advantage of the invention that the observed correctable fraction of SRS and its correction are essentially time-invariant. There are circumstances under which system capacity may be altered, e.g., by addition or subtraction of channels with changing traffic. Under these circumstances, it may be desirable to make an occasional adjustment in the filter. It is not contemplated that real-time adjustment will be required, but rather that modification may be after substantial periods of operation—after days or months. U.S. Pat. No. 5,225,922 describes a real-time arrangement with feedback for maintaining system output within desired levels. It is conceivable that it may be used in conjunction with filtering to correct or short-term variations.

For the most part, long-haul optical fiber communications has been based on digital transmission. The invention has been discussed in these terms. Underlying principles are applicable to analog transmission, although subject to SNR implications inherently unfavorable to analog. With the exception that particular care should be taken to maximize the relative impact of the deterministic portion of SRS, the inventive principles apply. Accordingly, shaped analog systems will be based on operation with large numbers of channels and using dispersive fiber. It may be that such systems will preferably operate with DCF or concatenation.

EXAMPLES

Data presented is based on information plotted on FIGS. 2 and 3.

Example 1

System operation as described in FIG. 2 with unshifted fiber of dispersion, 16 ps/nm-km permits 9 channels before shaping, and 60 channels with shaping. Capacity is increased by a factor of 6.7.

Example 2

System operation is for a 2000 km span of finite dispersion fiber of 2.5 ps/nm-km. Launch power is 0.66 mW/channel (−1.8 dBm/channel). Without shaping, the system capacity is 18 channels—with shaping, 80 channels (a capacity increase by a factor of 4.4).

Example 3

System operation is for a 1000 km span of DSF nominally of zero dispersion. Launch power is 0.33 mW/channel (−4.8 dBm/channel). Without shaping, the system capacity is 30 channels—with shaping, 60 channels (a capacity increase by a factor of 2).

What is claimed is:

1. Wavelength division multiplex optical waveguide system including a transmitter for introducing a set of modulated WDM channels of carrier wavelengths together defining a "WDM spectrum" at a system wavelength, a receiver, and an optical fiber transmission line connecting the transmitter and the receiver, the line including at least one span

CHARACTERIZED IN THAT the product of the number of channels, per-channel bit-rate, and span length is at least 320,000 km-Gb/sec, and in that the system includes, at at least one position in the span, means for shaping the WDM spectrum to result in decreased power level for a long wavelength channel relative to a short wavelength channel of the set, whereby SRS degradation is reduced, to enable operation satisfying the said product.

2. System of claim 1 in which the span includes at least one optical amplifier for simultaneously amplifying all WDM channels of the set, and in which the means for shaping lessens amplifier gain for the short wavelength channel relative to that for the long wavelength channel.

3. System of claim 2 in which the span includes a plurality of optical amplifiers.

4. System of claim 3 in which a means for shaping is included at the site of each amplifier.

5. System of claim 4 in which means includes a filter element, in which amplification of the WDM channels is of wavelength-varying slope, with amplification ratio for the longest wavelength channel larger than for the shortest wavelength channel by an amount which approximates the SRS depletion loss at the amplifier input.

6. System of claim 5 in which means consists essentially of a filter element.

7. System of claim 6 in which the filter element simultaneously shapes the spectral portion of the amplifier gain spectrum corresponding with the entire WDM spectrum.

8. System of claim 2 in which span length is at least 1000 km.

9. System of claim 8 in which the product of number of channels and per-channel bit-rate is at least 100 Gb/sec.

10. System of claim 2 in which the WDM set contains at least 8 channels.

11. System of claim 2 in which substantially all fiber in the span has a dispersion of at least 1.0 ps/nm-km at the system wavelength.

12. System of claim 1 in which the span length is at least 300 km and in which the span does not include an optical amplifier.

* * * * *